Figure 1:
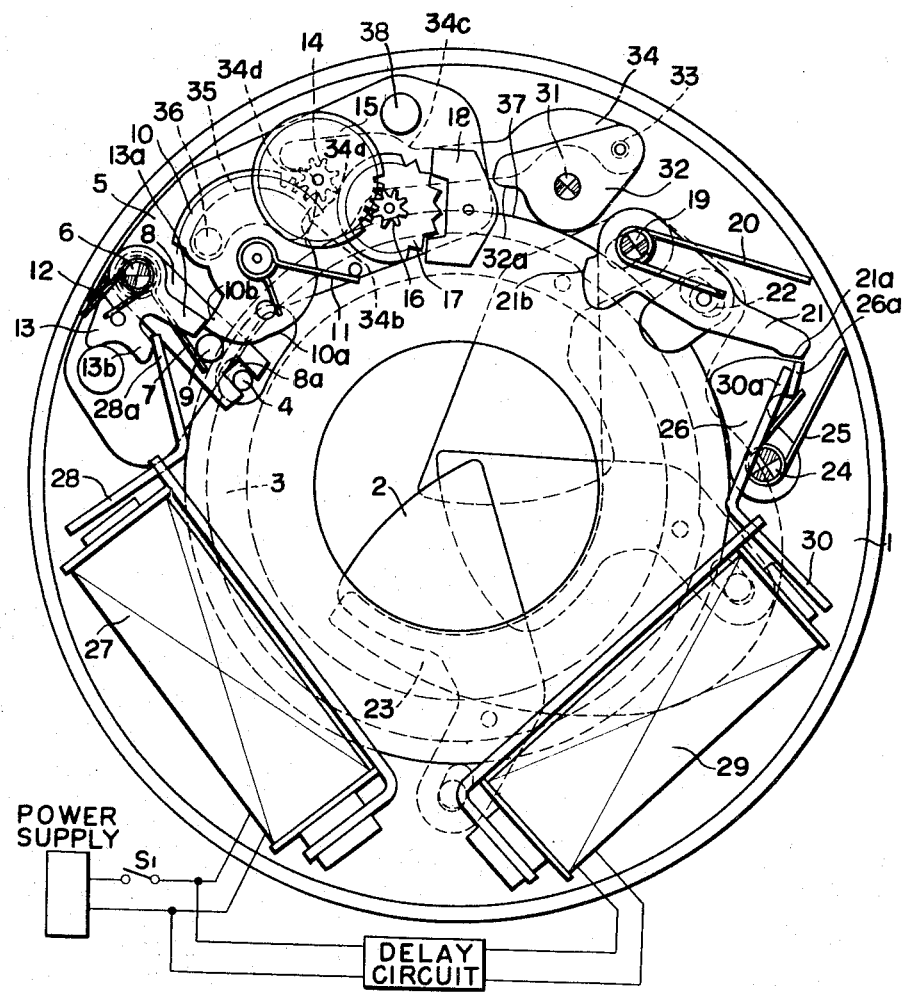

3,358,575
SHUTTER MECHANISM FOR CAMERAS
Kiyoshi Kitai, Shinjuku-ku, Tokyo-to, Japan, assignor to Kabushiki Kaisha Hattori Tokeiten, Tokyo-to, Japan, a joint-stock company of Japan
Filed Dec. 31, 1964, Ser. No. 422,592
Claims priority, application Japan, Jan. 9, 1964, 39/593
3 Claims. (Cl. 95—63)

This invention relates to a shutter mechanism for cameras and more particularly to a novel shutter mechanism having two sets of blades to vary the exposure value.

An essential object of the present invention is to determine both the exposure time and the aperture size by varying the starting time interval between two sets of blades, and then to vary the exposure value. According to the present invention, blades of one of two sets are the opening blades and the other set of blades are the closing blades. The opening blades are controlled by a control device so that the exposure aperture size is varied in proportion to the lapse of the time in a predetermined relation at a fairly slow speed in the opening process. On the other hand, upon lapse of a predetermined time during the opening movement of the opening blades, the closing blades are moved to close the shutter at a high speed. Thus the exposure value is determined.

(1) Without the provision of a diaphragm mechanism, the shutter mechanism can operate as a programmed shutter to adjust the exposure, value and by varying the configuration of a cam surface provided for the segment gear of the control device, various programs can be formed.

(2) By connecting a delay circuit to the shutter mechanism and by forming the cam surface of the segment gear of the control device to correspond to the illumination-resistance characteristic of a photocell such as a CdS photocell, it is possible to provide an EE (electric eye) shutter having an automatic exposure control feature without imposing undue conditions on the characteristic of the CdS photocell.

(3) A ring operating lever for the opening blades is disposed to be urged against the cam surface of the segment gear of the control device via a pin, under the force of a spring so that the opening blades may be opened by following said cam surface when said segment gear is rotated. Therefore, the spring for the segment gear is only required to provide time necessary for the opening process but not to furnish any extra force.

For this reason it becomes possible to make compact and simple the gear train of the control device, and since by locking a portion of the gear train during cocking operation of the shutter, the opening blades can be maintained in their closed condition, the power necessary for releasing of said blades by a shutter release mechanism can be greatly reduced. This is particularly advantageous in the case where the gear train is released by means of an electromagnet.

(4) It is possible to greatly simplify the cocking mechanism, because when cocking the shutter, the opening blades can be closed by setting the control device via the operating members for the opening blades.

(5) As the time required for the closing process is far smaller than that required for the opening process, and the optical effect of the aperture configuration defined by the closing blades is negligible, the closing blades may be formed with only two or one blade, thus greatly simplifying their construction.

Further objects and advantages of the present invention will become apparent and this invention will be better understood from the following description, reference being made to the accompanying drawings.

Figure 2:
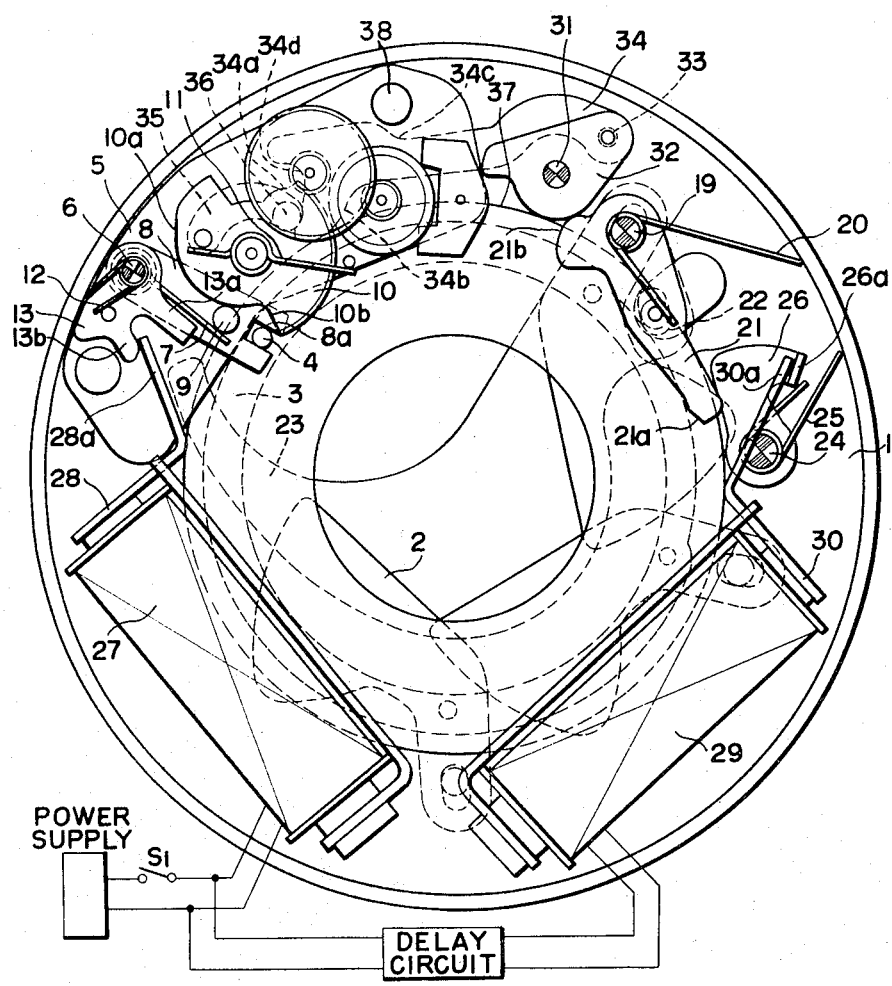
Figure 3:
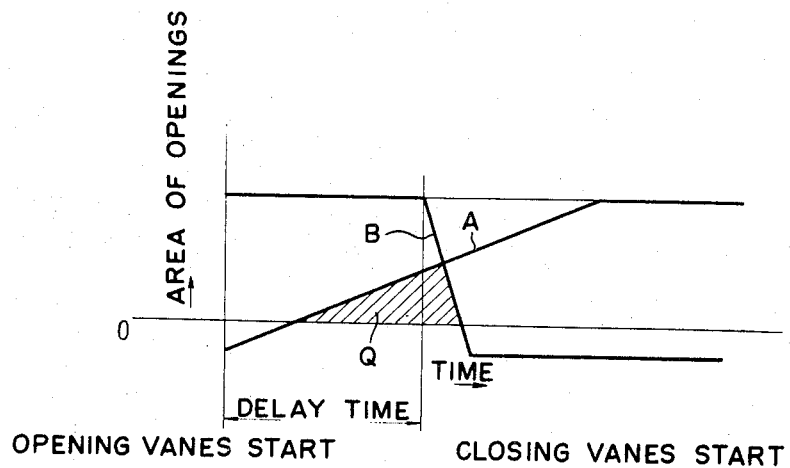
Figure 4:
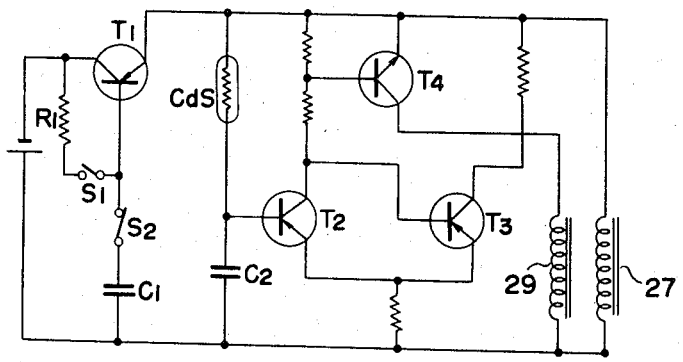

In the drawing:
FIG. 1 is a front elevation view of a shutter mechanism embodying the principle of this invention illustrating the shutter in a cocked charged condition;
FIG. 2 is a front elevation view of the shutter mechanism of FIG. 1 illustrating a state or condition after the opening blades and closing blades thereof have been operated;
FIG. 3 is a diagram to explain the operations of the opening and closing blades of the shutter mechanism of FIG. 1; and
FIG. 4 is an electric circuit diagram of an electronic control device utilized in the illustrated embodiment of the invention.

Referring now to the accompanying drawings which illustrate a preferred embodiment of this invention, on a shutter base plate 1 there is mounted a ring 3 which is free to rotate around an optical axis so as to close and open opening blades. The ring 3 carries a ring pin 4. A ring operating lever 8 has its axis of rotation on a base plate 5 of the control device and is urged toward a counterclockwise direction by a spring 7. The lever 8 is provided with a notch 8a at its free end to receive the ring pin 4. An actuating pin 9 uprightly secured to the ring operating lever 8 is urged against a cam surface 10a of the segment gear 10 by the force of a spring, and the spring 11 urges the segment gear 10 of the control device in a clockwise direction. The anchoring portion 10b of this segment gear 10 is locked by an arm 13a of a locking member 13 which is biased by a spring 12 to rotate in a counterclockwise direction around a pin 6 secured to the base plate 5 of the control device. The operating of the segment gear can be determined by the spring 11 and a gear train comprising the second pinion 14, the second gear 15, an escape pinion 16, an escape gear 17 and an anchor 18. A closing lever 21 is biased by a spring 20 to rotate in a clockwise direction around a pin 19 secured on the shutter base plate 1. A pin 22 secured to this lever 21 serves to drive closing blades 23. A locking member 26 for the closing lever is biased by a spring 25 to rotate in a counterclockwise direction around a pin 24 secured to the shutter base plate 1. The locking member has a bent up portion 26a which serves to lock the locking member 21a for the closing lever. On the other hand when a movable armature 28 is attracted by the energization of a first electromagnet 27 a free end 28a of the armature engages in a projection 13b of the locking member 13 for the segment gear to rotate it in clockwise direction to start the control device to open the shutter.

When a second electromagnet 29 is energized to attract its movable armature 30, a free end 30a thereof engages in the bent up portion 26a to cause it to turn in the clockwise direction. A cocking lever 32 pivoted on the shutter base plate 1 has a pin 33 secured thereon. A setting lever 34 for the control device is pivoted on the pin 33 to freely rotate around it. This lever 34 has a number of cam surfaces. More specifically, a first cam surface 34a is adapted to cooperate with a pin 36 of the segment gear when cocking the shutter, said pin 36 is extended in an arcuate slot 35 perforated through the base plate 5. A second cam surface 34c cooperates with a guide pin 38 for limiting the stop position of the setting lever 34 before and after cocking the shutter. The cocking lever 32 is provided with a projection 32a which serves to operate the cam surface 21b of the closing lever to rotate it to cock the shutter when the cocking lever 32 is rotated in a counterclockwise direction.

The operation of the shutter mechanism is as follows:

When a switch $S_1$ is closed, when the shutter mechanism is in its cocked state, the first electromagnet 27 is energized to attract the armature 28. As a consequence, the locking member 13 of the segment gear is rotated in a clockwise direction to unlock the segment gear 10 to permit it to begin to rotate in a clockwise direction at a constant speed under the biasing force of the spring 11 and the gear train. Thus the ring operating lever 8 is rotated in a counterclockwise direction via its pin 9 which follows the movement of the cam surface 10a of the segment gear. The movement of the lever 8 causes the ring 3 to rotate in a clockwise direction via its pin 4 to open the opening blades 2, thus commencing exposure. The exposure aperture size defined by the opening blades 2 is varied as the angle of rotation of the segment gear is varied as shown in a curve A of FIG. 3, on the other hand as the movement of the closing lever 21 is prevented by the locking member 26, the closing blades are maintained in their opened state. Thus when a predetermined time interval has elapsed under the action of an electric delay circuit, connected as shown, after closure of the switch $S_1$, the second electromagnet 29 is energized to attract its armature 30 to rotate the locking member 26 for the closing lever in a clockwise direction. As a result the closing lever 21 is released and permitted to rotate in a clockwise direction under the biasing force of the spring 20 to close the closing blades at a high speed as shown in a curve B of FIG. 3, thus completing exposure. By the action described hereinbefore, an amount of exposure corresponding to a shaded area Q defined by a curve A representing the variation in the aperture size defined by opening blades and a curve B representing the variation in the aperture size defined by the closing blades 23, as shown in FIG. 3.

To cock the shutter, while the mechanism is in a state as shown in FIG. 2, the switch $S_1$ is opened and the cocking lever 32 is rotated in a counterclockwise direction. As a result, a pointed portion defined by the cam surfaces 34a and 34b of the setting lever 34 will be forced like a wedge into a space between the pin 36 of the segment gear and a side surface 37 of the shutter base plate. When the pin 36 of the first gear moves along the cam surface 34a of the setting lever 34 and arrives at a depression 34d at the end of the cam surface, the setting lever 34 acts as a linkage thereby to rotate the segment gear 10 against the action of the spring 11. The ring operating lever 8 follows the movement of the cam surface 10a through the pin 9 to rotate in a clockwise direction against the force of the spring 7. The ring 3 is rotated in a counterclockwise direction through the pin 4 to close the opening blades. The opening blades are closed completely, thereafter the projection 32a of the lever is rotated further to rotate the closing lever, and then the closing blades are opened. At the end of the shutter cocking process, locking of the segment gear 10 and the closing lever is simultaneously effected respectively by the locking member 13 for the segment gear and the locking member 26 for the closing lever.

After the working action, a cocking lever 32 is reset by turning it in the clockwise direction so that the setting lever 34 will not interfere with the operation of the segment gear 10. In addition, the projection 32a of the cocking lever retracts to a position not to interfere with the operation of the closing lever 21. By the operation described above, the mechanism is brought to the state shown in FIG. 1, thus cocking the shutter.

While in the foregoing embodiment, the control device is started to operate by energizing the first electromagnet, any one of well known mechanical means may be substituted for the first electromagnet to unlock the segment gear and thereafter to close the switch $S_1$ by utilizing initial movement of the segment gear or of a member associated therewith, thereby to unlock the closing lever 21 by the second electromagnet 29 through a delay circuit.

It will be clear that when the first and second electromagnets 27 and 29 are connected in an electric delay circuit as shown in FIG. 4, features of a self-timer and an EE shutter can be provided. Namely, the time constant afforded by a resistor $R_1$ and a capacitor $C_1$ is adjusted to about 10 seconds, and a switch $S_2$ for self-timer action is maintained closed. Under this condition, when the switch $S_1$ is closed, the capacitor $C_1$ is not fully charged, thereby the base voltage (between the base and the emitter) of the transistor $T_1$ is not so high as to cause the transistor to be conductive at this first stage. But it gradually rises in accordance with the capacitor $C_1$ charging through the resistor $R_1$, at last the transistor $T_1$ becomes conductive. And then, the switch $S_2$ of an electric delay circuit is turned on. As a result, firstly the first electromagnet 27 is magnetized to unlock the locking member 13 for the segment gear 10. Concurrently a capacitor $C_2$ is charged through a photoconductor CdS which varies its resistance in response to the brightness of the object, and the base voltage of a transistor $T_2$ lower in lapse of time. This transistor $T_2$ became conductive in response to the time constant afforded by the photoconductor CdS and a capacitor $C_2$. At the same time, a transistor $T_4$ became conductive through the action of another transistor $T_3$. Thus the second electromagnet 29 is magnetized to unlock the locking member 26 for the closing lever 21 after a lapse of time in response to the brightness of the object.

When the self-timer is not used, the transistor $T_1$ becomes conductive simultaneously with the closure of the switch $S_1$, thus causing an adequate exposure corresponding to the brightness of the object.

While the invention has been explained by describing particular embodiments thereof, it will be apparent that improvements and modifications may be made therein without departing from the scope of the invention as defined in the appended claims.

What I claim is:

1. In a shutter mechanism for a camera having opening blades normally closed operable from a closed state in an opening direction defining a diaphragm aperture, and closing blades normally open operable from an opened state in a closing direction, means for driving said opening blades and means for driving said closing blades at a speed faster than a speed at which said opening blades are driven, the improvement which comprises a programmable control device controlling opening of said opening blades in accordance with a predetermined relation between the lapse of time in the opening of said blades and the diameter of said diaphragm aperture, a control member in said programmable control device cooperative with said means for driving said opening blades, and variably operable delay means controlling closing of said closing blades operable to vary after the opening blades start to open the starting time of the closing blades thereby to determine the exposure value.

2. A shutter mechanism according to claim 1, including means comprising a shutter cocking lever for setting said control device, closing said opening blades and opening the closing blades, whereby operation of said cocking lever sets said control device and completely cocks said shutter and places it in complete readiness for an exposure.

3. A shutter mechanism according to claim 1, in which said control device comprises a gear train, a segment gear in said gear train, said control member comprising a cam associated with said segment gear, said means driving said opening blades comprising a driving member arranged to contact and follow said cam, and means maintaining said opening blades normally closed comprising means releasably locking said gear train.

References Cited

UNITED STATES PATENTS

| | | | |
|---|---|---|---|
| 2,195,330 | 3/1940 | Hineline | 95—55 |
| 2,441,675 | 5/1948 | Simmon | 95—63 |
| 2,463,206 | 1/1949 | Robertson | 95—63 |
| 2,800,844 | 7/1957 | Durst | 95—60 |
| 2,803,181 | 8/1957 | Willcox | 95—63 |
| 3,208,365 | 9/1965 | Cooper | 95—60 |
| 2,978,970 | 4/1961 | Fahlenberg | 95—53.3 X |
| 3,008,395 | 11/1961 | Ieda | 95—53.3 X |
| 3,165,996 | 1/1965 | Kiper | 95—64 |
| 3,199,428 | 8/1965 | Kiper | 95—62 |
| 3,203,329 | 8/1965 | Weiss | 95—63 |

JOHN M. HORAN, *Primary Examiner.*